April 27, 1954 P. C. WILBUR 2,676,891
METHODS FOR COOLING SEALED FOOD CONTAINING CANS
IN CONTINUOUS STERILIZATION PROCESSES
Filed Jan. 26, 1950 2 Sheets-Sheet 1

INVENTOR
PAUL C. WILBUR.
BY Hans G. Hoffmeister
ATTORNEY

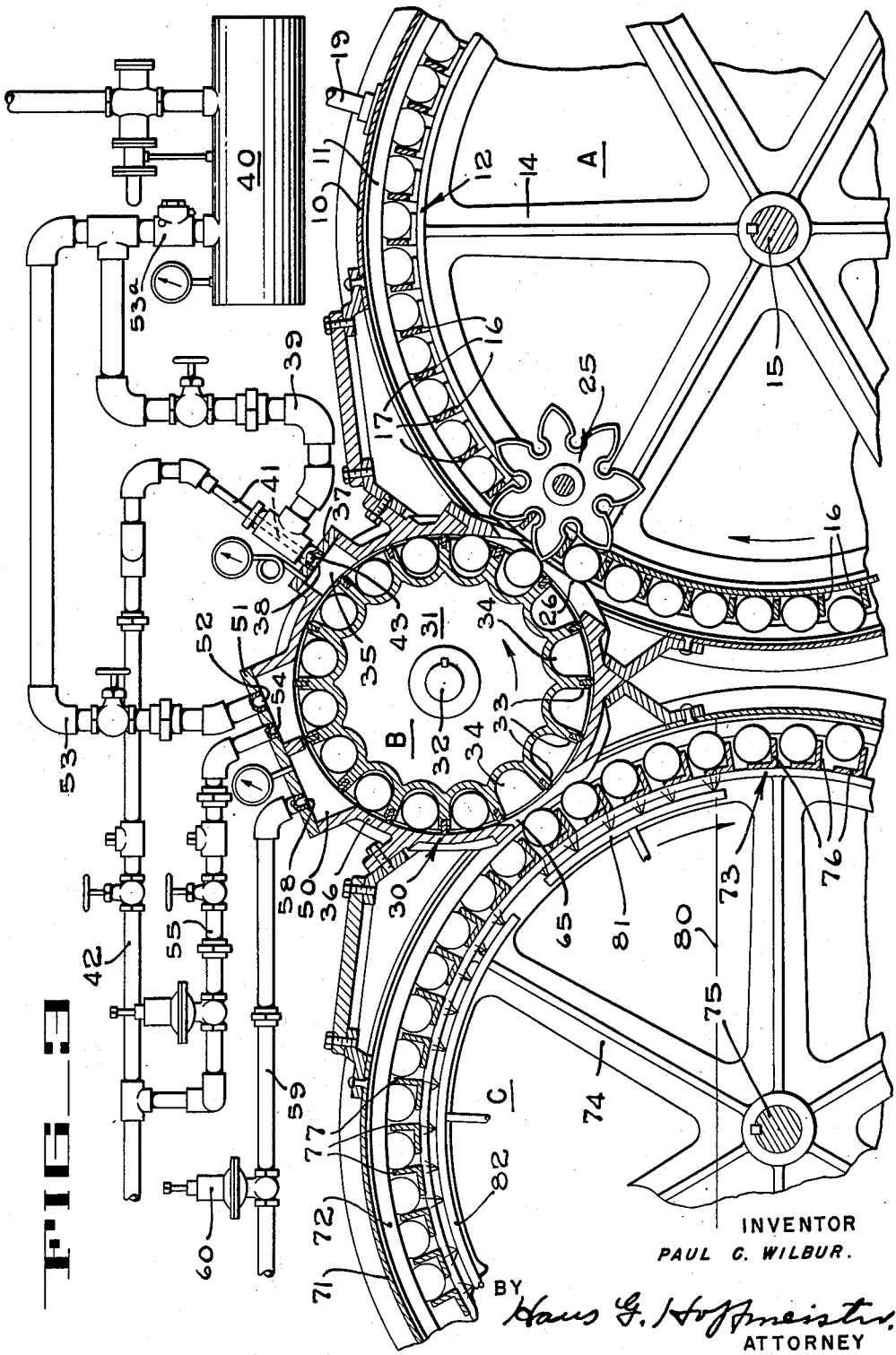

UNITED STATES PATENT OFFICE

2,676,891

METHODS FOR COOLING SEALED FOOD CONTAINING CANS IN CONTINUOUS STERILIZATION PROCESSES

Paul C. Wilbur, San Jose, Calif., assignor to Food Machinery and Chemical Corporation, San Jose, Calif., a corporation of Delaware Application January 26, 1950, Serial No. 140,683

7 Claims. (Cl. 99—214)

The present invention relates to the art of sterilizing food products in sealed metal containers commonly known as cans. The sterilization necessary for the preservation of the canned food products may conveniently be carried out by passing the sealed cans in continuous procession through a confined atmosphere of steam or steam and a non-condensable gas, such as air, heated to temperatures usually within the range between 240° F. and 270° F. for a sufficient period of time to destroy bacterial life. Upon completion of the sterilization treatment the cans are removed from said atmosphere, and since the heat of the sterilization process, if continued beyond the time necessary for the destruction of bacterial life, is liable to produce undesirable quality changes in the canned food product, the heat treated cans should be rapidly cooled either by spraying them with water or submerging them in a water bath to preserve the flavor and appearance of the sterilized product.

When food-containing cans are sealed, they are scarcely ever filled completely, so that there remains a space between the level of the enclosed food product and the top wall of the cans which is commonly termed the "head space" of the cans. With most methods of sealing the cans, said head space contains not only vapor, but also varying quantities of air. Therefore, the total gas pressure within the head space of a sealed can equals the sum of the vapor pressure of the liquid can contents plus the pressure of the occluded air plus the pressure of what other non-condensable gas or gases may have been occluded in the can during the sealing operation or may have developed from the food product during the sterilization process.

The present invention relates particularly to the processing of cans that have been closed under conditions which seal into the head space of said cans a number of non-condensable gases in addition to the vapor generated by the liquid can contents.

When sealed food-containing cans are heated for the purpose of sterilization, the total pressure within the can is greatly increased and will tend to expand the can. Depending upon its size, the material from which it is made and its manner of manufacture, particularly the contour of the lid of the can, each type of can has a critical endurance limit for internal pressure commonly known as the "buckling pressure" of the can; that is to say, if the internal pressure exceeds the external pressure, that weighs upon the can, by said buckling pressure, the can will expand beyond its elastic limit and will be permanently deformed, the most prevalent type of deformation occurring at the can ends in the form of "buckles." Such permanent deformations do not only detract from the appearance of the cans but are frequently accompanied by weakening of the can seams, so that leaks may be produced through which micro organisms are admitted into the interior of the can resulting in spoilage of the enclosed food product. It is particularly in cans sealed under conditions which occlude non-condensable gases in addition to vapor in their head spaces that, upon heating to temperatures commonly employed in sterilization, the internal pressure tends to rise to a point where it may damage the can structure. During the actual sterilization process the increase in internal can pressure developed by the temperature increase of the can contents is largely counterbalanced by the pressure of the confined sterilizing atmosphere. However, when the can is abruptly removed from the sterilization atmosphere at the end of the sterilization treatment as is the case in sterilizers of the continuous type the protective counterpressure of said sterilizing atmosphere is withdrawn at a moment when the can contents have reached their highest temperature and the pressure developed within the can is at its maximum.

It has, therefore, been common practice to maintain the cans under pressure after they leave the sterilizer, and for this purpose continuous sterilizers have been combined with "closed" coolers, wherein an atmosphere of compressed air is maintained above the cooling liquid. While this method is effective to protect cans from buckling, pressure coolers of this type are necessarily of a heavy construction and add to the cost and complexity of the total sterilizer equipment. Moreover, they are liable to damage the processed cans in a manner opposite to the damage caused by excessive internal pressures; for all cans have a definite endurance limit for external pressures commonly termed the "panelling pressure" which depends upon the size, material and manner of manufacture of the particular can; that is to say, if the external pressure exerted upon a can exceeds the internal can pressure by the value of said panelling pressure, the can may collapse or its side wall may form flat areas, a phenomenon known as panelling, which impairs the appearance of the can and is likely to produce leaks. Therefore, while the pressure imposed upon the cooling liquid of a pressure cooler may be appropriate to protect the cans from buckling at the entrance point of the cooler where the cans arrive in highly heated condition, it may be excessive at the end of the cooling period because the cans cool progressively as they travel through the cooler which causes their internal pressure to drop; and said internal pressure may eventually drop to a value at which the cans are no longer capable of withstanding the cooler pressure so that panelling will occur; moreover, large external pressures applied to cans, while their internal pressure is low, increase the danger of seepage of contaminated cooling water into their interior through minute leaks in the can seams.

It has therefore been frequently necessary to split the coolers into two consecutive sections, a first one maintaining superatmospheric pressure upon the cooling liquid to protect the cans from buckling, as they emerge in highly heated condition from the sterilizer, and a second one providing atmospheric cooling to avoid panelling of the cans during the final phase of their travel through the cooler. Such "split-cooler" constructions add further to the cost and complexity of continuous sterilizer equipment and in many instances make it unprofitable to employ such equipment in practice.

It is an object of the present invention to provide a safe, simple and inexpensive way of cooling heated food-containing cans that were sealed under conditions causing non-condensable gases to be occluded in their head spaces.

It is another object to eliminate, in continuous can sterilizing processes, the conventional forms of pressure-cooling with their complex and costly equipment without exposing the cans to the risk of buckling.

Still another object is to provide a simple and effective method of handling sealed cans passing through a continuous sterilizer to effect cooling thereof in a manner safeguarding them from both buckling and panelling alike, without the use of costly split-pressure-cooling equipment.

Additionally, it is an object to provide apparatus for treating sealed food-containing cans, as they emerge from the sterilizer, in such a manner that they may be cooled in atmospheric coolers without the danger of buckling.

Moreover, it is an object to provide a can discharge valve, for continuous sterilizers, adapted to rapidly decrease the internal can pressure in such a manner that the discharged cans may safely be cooled in atmospheric coolers.

These and other objects of the present invention will be apparent from the following description of the accompanying drawings which illustrate a preferred embodiment thereof and wherein:

Figure 3 is a vertical cross section through combined sterilizer and cooler equipment of the continuous type provided with a preferred embodiment of an apparatus by means of which the process of my invention may be carried out in practice.

Figure 2:
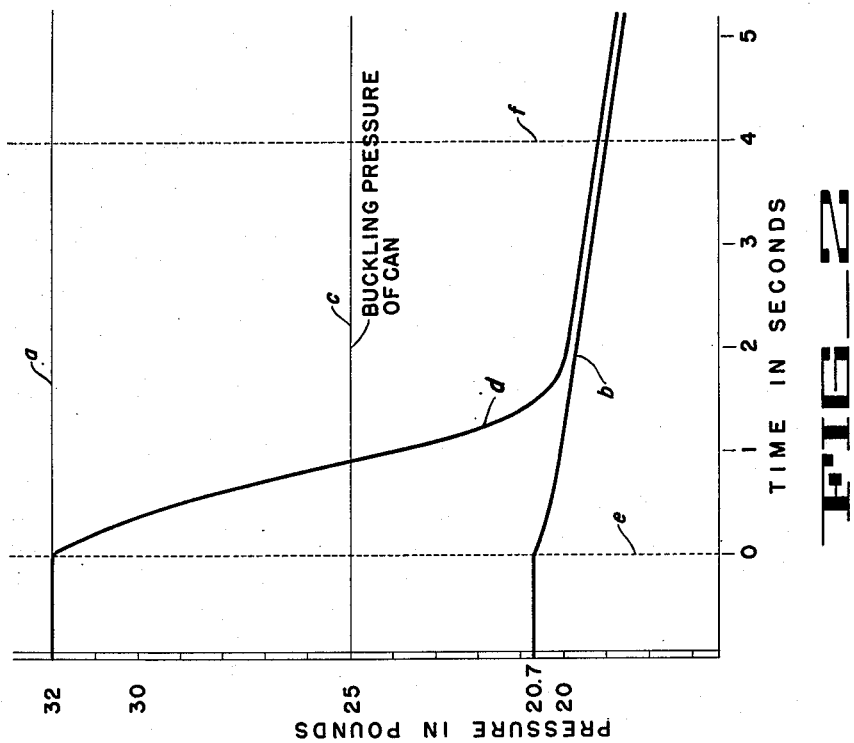
Figure 2 is a curve diagram illustrating the effects of the cooling process of the invention upon the pressure conditions within the can illustrated in Figure 1.

The present invention proceeds from the cognition that the total pressure existing in the head space of sealed cans heated to sterilization temperatures is materially higher than the vapor pressure of the liquid can contents due to the presence, in addition to water vapor, of non-condensable gases, amongst them notably the nitrogen of the air occluded during the sealing of the can and other gases, such as residual oxygen or carbon dioxide, that may have been formed by or desorbed from the food product as a result of the heat of the sterilization process. The invention is based upon the discovery that upon application of a cooling medium to the head space portion of a can, heated to a sterilization temperature, the total pressure of the gases within the head space drops in a matter of seconds to approximately the level of the vapor pressure of the liquid can contents and will not again rise to harmfully higher values if cooling of the can is thereafter continued uninterruptedly. Hence, if the temperature of the sterilizing atmosphere is adjusted to a level maintaining the vapor pressure of the liquid can contents safely below the buckling pressure of the cans employed, brief application of a cooling medium to the head space portion of the heated cans as they leave the sterilizing atmosphere will suffice to permit subsequent cooling of the cans in atmospheric coolers without exposing them to the danger of buckling, provided there is practically uninterrupted continuity between the described preliminary application of a cooling medium to the head space of the cans and the atmospheric cooling process. Thus, pressure cooling, whether it be by means of split or completely pressurized coolers, is rendered dispensible and cans treated in accordance with my invention are not only protected from buckling without need to resort to the expense and complexity of pressure cooling equipment, but are also safe from panelling and re-contamination of the can contents with micro organisms from the cooling medium, such as may be caused by excessive external pressure upon the cans in the final phases of the cooling process.

I have found that the unexpectedly rapid and substantial decrease in the total head space pressure of a can heated to a sterilization temperature upon application of a cooling medium to its head space portion is due to the fact that extremely rapid condensation of part of the water vapor in the head space is caused which cannot be replaced with equal speed from the liquid can contents, in spite of the elevated temperature thereof, owing to the presence of the non-condensable gases mentioned above, because the partial pressures exerted by said non-condensable gases maintain the total head space pressure in the can for a brief period above the vapor pressure of the liquid can contents, so that ebullition of the liquid can contents, which is the only manner of rapid replacement of condensed vapor, cannot occur immediately and replacement of the condensed vapor is at first dependent upon the far slower process of evaporation. Therefore, the vapor condensation produced by application of the cooling medium to the head space of a heated can causes the total head space pressure to drop progressively to about the level of the vapor pressure of the liquid can contents. Only after the total head space pressure has dropped to or below said level, may ebullition of the liquid can contents occur but will presently cease as it causes the total head space pressure in the can to rise again to, or slightly above, the vapor pressure of the liquid can contents. As a result thereof the total head space pressure in the can will adjust itself to approximately the level of the vapor pressure of the liquid can contents which is below the buckling pressure of the can, since the sterilizing temperature was initially adjusted in relation to the durability of the cans employed, as previously pointed out; and as long as the cooling of the can is continued without interruption the total head space pressure in said can will not appreciably rise above said level, but will gradually drop as the vapor pressure of the liquid can contents decreases with progressive cooling of said can contents. Thus, once the head space pressure of a can has been decreased in the manner described above, the can may be cooled under atmospheric conditions without risking injury due to excessive internal pressures.

Figure 1:
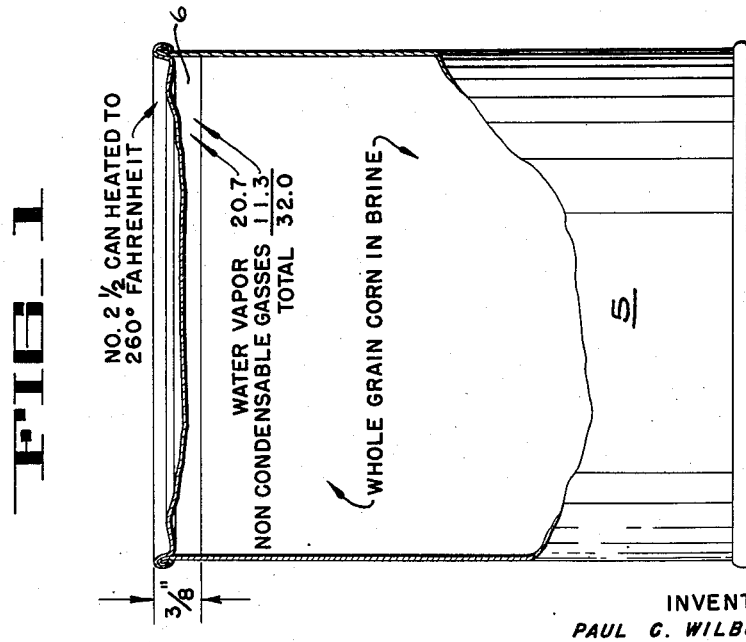
Figure 1 illustrates diagrammatically the pressure conditions existing within a sealed can at the end of sterilization.

Referring to the drawings, Figure 1 illustrates diagrammatically a #2½ size metal can 5 filled with brine-packed whole grain corn to a level leaving a head space 6 of, say, ⅜", measured from the top of the double seam to the liquid surface, which contains vapor and non-condensable gas, the latter being primarily air. The buckling pressure of the can is about 25 pounds. Assuming that the can was sealed at a temperature of 170 degrees F., a pressure of about 32 pounds' gage is developed within the can when the can is subjected to an atmosphere of saturated steam at a sterilizing temperature of 260° F. Of this pressure about 20.7 pounds is due to the water vapor while the remainder is due to the non-condensable gas in its head space. When steam is employed as heating medium as pointed out above, the pressure of the sterilizing atmosphere is also about 20.7 so that the differential between the pressures exerted upon can 5 from within and from without is only about 11.3 pounds which is well below the buckling pressure of the can. Hence, the can is safe from buckling, while within the sterilizing atmosphere, but upon removal into the outside atmosphere would buckle almost instantaneouly. Therefore, in accordance with the invention the can is contacted with cold water for a few seconds as it is removed from the sterilizing atmosphere. This causes condensation of part of the water vapor contained in the head space of the can which cannot be replaced with equal speed from the heated liquid in the can due to the partial pressure imposed upon said liquid by the non-condensable gases present which maintain the total pressure for a limited time above the vapor pressure of the liquid can contents and thus prevent ebullition. With condensation thus proceeding at a faster rate than evaporation, the total pressure within the head space of the can drops rapidly to about the level of the vapor pressure of the hottest parts of the liquid can contents which in the present instance is, at the most, about 20.7 pounds and is safely below the buckling point of the can.

In Figure 2 the total head space pressure of can 5 is plotted against time measured in seconds. In said figure the upper horizontal line $a$ marks the maximum pressure developed in the can at the end of the sterilizing process which, as previously indicated, is about 32 pounds' gage. The lower declining line $b$ represents the course of the vapor pressure of the hottest part of the liquid can contents during cooling starting at the sterilizing temperature of 260° F. at which said vapor pressure is about 20.7 pounds' gage. The horizontal line $c$ in the middle of the diagram marks the buckling pressure of can 5 which is about 25 pounds. The curve $d$ drawn in the heavy line represents the total head space pressure and indicates by the steepness of its downward slope how the total pressure within the can drops from the moment when the cooling medium is applied, as indicated by the dotted vertical line $e$, in little more than two seconds to almost the level $b$ of the vapor pressure of the liquid can contents which is well below the line $c$ that represents the buckling pressure of the can; and if cooling is continued without interruption, the total head space pressure may not only be maintained at said low level, but will gradually decline still further as the food product in the can begins to cool.

Therefore, when a can is cooled in accordance with my invention, it is only necessary to protect it from buckling over the brief period till the steep slope of the curve $d$ drops below the buckling line $c$, whereupon cooling may safely be continued under atmospheric conditions. In practice this protection may be conveniently accomplished by surrounding the can with an atmosphere of compressed air as the preliminary cooling treatment is applied. Said protective atmosphere of compressed air should be placed around the can at or prior to the moment when the preliminary cooling medium is applied to the can, since application of said cooling medium will rapidly condense the previously existing protective atmosphere of steam that originated in the sterilizer; and said protective atmosphere of compressed air will automatically be released upon completion of the preliminary cooling treatment when the can enters the atmospheric cooler, as marked by the dotted vertical line $f$ in Figure 2.

The time over which application of the preliminary cooling medium should be extended to reduce the total head space pressure in the cans below the buckling point varies considerably depending upon the size of the cans, the sterilizing temperatures employed and the nature of the canned food product, but will always be very short. I have found that in continuous sterilizing methods operating at the customary sterilization temperatures ranging from, say, 240° F. to 265° F. the application of a cooling medium to the head spaces of cans of most of the customary sizes need not exceed 20 seconds, to permit subsequent cooling of the cans in atmospheric coolers without exposing them to the risk of buckling, and need in certain instances last only about ½ of a second. I have also found that the actual temperature of the preliminary cooling medium is not critical and may vary within wide limits without appreciable effect upon the results obtained. For instance, the above discussed curve $d$ in Figure 2 was obtained by using water of a temperature of about 67° F. as the preliminary cooling medium.

As a result of the rapid pressure drop obtained in accordance with the invention, as explained above, the complex and costly pressure cooling equipment previously considered an essential portion of continuous sterilizers may be dispensed with, and it will suffice to apply a cooling medium to the head space of the cans while they negotiate the customary sterilizer discharge valve.

In the combined sterilizing and cooling arrangement illustrated in Figure 3, sealed food-containing metal cans are conducted in a continuous procession through a sterilizer A from where they are transferred by means of a transfer valve B into an atmospheric cooler C. The sterilizer A may be of the type disclosed in my co-pending United States Patent application serial No. 698,413, filed September 21, 1946, for "Methods and Apparatus for Heat Treating Food and Food Products," now Patent No. 2,536,116, to which reference is made for a detailed description.

Briefly, it comprises a closed shell or housing 10 of cylindrical shape, the inner face of which carries a helical ridge or flange 11 of limited depth and a pitch slightly larger than the axial length of the cans to be processed. Mounted coaxially within said housing 10 is a rotatable reel 12 formed by a number of wheels 14 which are mounted upon a common drive shaft 15 and carry upon their peripheral surfaces a plurality of longitudinally extending parallel angle bars 16. Said angle bars have short radially directed flanges 17 which extend within close proximity of the inwardly directed helical ridge 11 and which are circumferentially spaced from one another by a distance slightly larger than the diameter of the cans to be processed.

Means are provided to establish and maintain a sterilizing atmosphere of a desired temperature within the housing 10, as indicated by the thermostatically controlled steam supply conduit 19.

The sealed food-containing cans are introduced into the sterilizer A by means of suitable valving mechanism (not shown), which drops them at one end of the housing 10 in timed relation between the flanges 17 of the continuously revolving reel 12. With said reel revolving in the direction of ascent of the helical ridge 11—which is in clockwise direction as viewed in Figure 3—the cans entrained between the flanges 17 engage, and are gradually shifted in an axial direction by said ridge, so that they pass through the sterilizer along a helical path from one to the other end of the housing 10, their time of exposure to the sterilizing atmosphere being determined by the speed with which the reel 12 is operated.

The time over which a food-containing can should be exposed to a sterilizing atmosphere and the exact temperature of said atmosphere are interrelated and depend upon the nature of the product to be sterilized and the size of the cans employed; longer exposure periods are required for lower sterilizing temperatures, and shorter exposure periods will suffice when higher sterilizing temperatures are employed. In accordance with the invention the temperature established within the sterilizer A should be so chosen that the vapor pressure of the liquid can contents at said temperature does not exceed the buckling pressure of the particular type of can employed. For instance, the previously discussed #2½ size can 5 is able to withstand a pressure differential of up to 25 pounds of internal pressure over external pressure before it buckles. Assuming the liquid component of the food product contained in the can to be weak salt brine, said brine may be heated to about a temperature of 267° F. before its internal vapor pressure approaches 25 pounds' gage. Hence, the temperature established in the sterilizer should be below 267° F., which limit is above the range of temperatures ordinarily employed for sterilizing food products within sealed containers.

At the end of the helical path of the can procession within the sterilizer A, a star wheel mechanism 25 rotatably mounted within the sterilizer housing 10 sweeps the cans through an aperture 26 of said housing within the reach of a transfer mechanism B adapted to transfer the cans from the sterilizer A at a minimum loss of pressure onto the cooler C. In the particular embodiment of the invention illustrated in the accompanying drawings, said valve mechanism comprises an outer casing 30 of cylindrical shape which communicates with the interior of both the sterilizer A and the cooler C and is suitably supported from the outer shells of both, as shown. Within said cylindrical casing 30 a rotor 31 in the form of a star wheel is firmly mounted upon a horizontal drive shaft 32, arranged to turn continuously in counterclockwise direction, as viewed in Figure 3 and the points 33 of said star-shaped rotor are designed to form an endless sequence of pockets 34 each adapted to receive and accommodate a can of the size for which the described sterilizer equipment is designed.

In accordance with my invention the valve mechanism B comprises means for treating the cans in the brief period of time, while they are transferred from the sterilizer A to the cooler C, in such a manner that the cooler C may be held under atmospheric pressure without risking buckling of the cans.

As a can is transferred by one of the fingers of the star-shaped rotor 31 from within the sterilizer housing 10 into a registering pocket 34 of the said rotor, it is still under the pressure of the sterilizing atmosphere maintained within the chamber 10 and even after a pocket 34 has advanced in counterclockwise direction to an extent where the shell 30 of the transfer valve B cuts it off completely from the sterilizing chamber 10, the steam atmosphere entrained in said pocket will continue to protect the can within the pocket from buckling.

Shortly after a pocket 34 has lost communication with the sterilizer chamber 10 it encounters a chamber 35 extending along the periphery of the star-shaped rotor 32 and formed by an outwardly directed recess in the cylindrical wall 36 of the valve casing 30. The ceiling of said chamber may be formed by a detachable lid 37, and arranged within said lid is the inlet port 38 of an air supply conduit 39 through which air is delivered under pressure into the chamber 35 from a manifold 40. Disposed coaxially within the terminal portion of said air supply conduit 39 is a pipe 41 which conducts water under pressure from a manifold 42 into the chamber 35 and the end of which may be provided with a suitable spray nozzle 43. The primary purpose of chamber 35 is to replace the unstable atmosphere of steam which surrounds the cans up to this point and which is bound to collapse upon contact with the cooling medium, by a protective atmosphere of compressed air that will remain in force through the preliminary cooling treatment as provided in accordance with the invention. The main purpose of the fine spray of cold water injected into the chamber 35 through the pipe 41 is therefore to effect partial condensation of the vapor in pockets 34 and thus make room for the influx of compressed air through conduit 39, and said air supply conduit should be sufficiently large, and the pressure under which the air is delivered into the chamber 35 through said conduit should be sufficiently high to produce an inflow of air as fast as the steam is condensed by contact with the water spray. I have found that when the size of the air supply conduit 40 is 2" or larger an air pressure in the air supply manifold 40 of one pound in excess of the pressure maintained in the sterilizing chamber 10 will effect the described substitution of air for steam in a manner combining safety with speed. After the major portion of the protective steam atmosphere around a can entrained in a pocket 34 has thus been exchanged against a more durable atmosphere of compressed air, pocket and can encounter another chamber 50 extending along the periphery of the star-shaped rotor 31. Said chamber 50 is of greater length, circumferentially of the star wheel 31, than the chamber 35, but like chamber 35 it is formed by an outwardly directed open recess in the cylindrical wall 36 of the valve casing 30, which is covered by a detachable lid 51. Within said lid is arranged the inlet port 52 of an air supply conduit 53 which directs air under pressure from the previously mentioned manifold 40 into the chamber 50 to maintain the protective atmosphere of compressed air that was formed around the cans in chamber 35. Also arranged within said lid is the inlet port 54 of a water conduit 55 which delivers water from the previously mentioned manifold 42 into the chamber 50 and against the upwardly directed segments of the cans as they pass through said chamber 50. To insure rapid inflow of the cooling water and thus derive maximum benefit from the preliminary cooling of the cans, as provided in accordance with the invention, the water should be delivered into said chamber under a pressure substantially greater than the pressure maintained within the air supply manifold 40. In practice I have found that a water pressure of 10 pounds in excess of the air supply pressure is adequate to apply the cooling water effectively to the passing cans.

To guard the chamber 50 from excessive pressures a port 58 within the lid 51 provides access to a relief line 59 which is controlled by an adjustable pressure relief valve 60 and through which an excess of air and/or water may escape from chamber 50 whenever the pressure within said chamber exceeds a predetermined level. I have found that the pressure within the chamber 50 may be maintained at a suitable level by providing a suitable check valve 53a in the air supply conduit 53 and setting the relief valve 60 to about two pounds above the pressure in the air supply manifold 40.

Due to the location of the chambers 35 and 50 along the upper sector of the cylindrical valve casing 30 it is the upper segments of the cans passing through said chambers that are primarily exposed to contact with the cooling water issuing from the inlet ports of the conduits 41 and 55. Furthermore, due to the particular location of chamber 50 somewhat beyond the crest of the rotary course of the pockets 34 there is no chance for cooling water to accumulate in the clockwise corner of said chamber 50. This prevents effectively, seepage of cold water in a direction opposite to the direction in which the process of the invention proceeds to can containing pockets 34, before they enter into communication with the chamber 35, where said water might cause premature condensation of the steam atmosphere surrounding the cans.

The length of time during which the cans in the transfer valve are subjected to the above described preliminary cooling treatment depends on the rate at which the sterilizer is operated and upon the distance between the point at which the cans are first contacted with cooling water and the point at which the pockets 34 move into registry with the discharge aperture 65 of the valve casing 30, at the left lower segment thereof, through which the transfer valve communicates with the cooler C and through which the atmosphere of compressed air in the pocket is instantaneously released: In the particular embodiment of the invention illustrated in Figure 3 this distance is of such length circumferentially of the rotor 31 as to encompass about eight of its pockets. Hence, if the sterilizer is run at a rate of say 100 cans per minute, each can requires 4.8 seconds to negotiate the above defined preliminary cooling sector of the transfer valve B and is therefore cooled for a period of about 4.8 seconds, which is ample to reduce the total head space pressure of a food-containing can, of the type represented by Figure 1, to the level of the vapor pressure of the liquid can contents. If the rate at which the sterilizer is operated is about 400 cans per minute, however, the time required for a can to negotiate the preliminary cooling sector of the valve mechanism B would only be about 1.2 seconds which is still ample in most instances to reduce the total pressure in the cans to a level below their buckling points, and thus render the use of pressure cooling equipment unnecessary.

After the cans entrained in the pockets 34 of the rotor 31 have passed through the above defined preliminary cooling sector and as said rotor carries them past the previously mentioned aperture in the left lower segment of the valve casing 30, they drop through said opening into the cooler C. Said cooler is of a construction similar to the sterilizer A comprising a tank formed by an outer cylindrical shell 71, which is provided with an inwardly directed helical rib 72 and within which is rotatably mounted a reel 73. Said reel is formed by a number of wheels 74 mounted upon a common drive shaft 75 and a plurality of longitudinally disposed angle bars 76 rigidly attached to said wheels with their radially directed flanges 77 spaced, circumferentially of said wheels, over a distance somewhat larger than the diameter of the cans to be processed. The cans dropping from the pockets 34 in the star shaped rotor 31 through the aperture 65 are received into the spaces formed between adjacent ones of the angle bar flanges 77 of the reel 73 which turns continuously in clockwise direction and, therefore, carries the cans over the shortest distance into the bath of cooling water maintained in tank 71, as indicated by the line 80. Suitable means, such as another star wheel mechanism (not shown), may be provided to dependently remove the cans from the pockets 34 and to prevent them from re-entering said pockets again if they bounce back from the cooler reel. Between the flanges of the reel the cans are then carried along a helical path determined by the ridge 72 through the cooling bath from one to the other end of the cylindracl tank 71, where they may be discharged in any suitable manner upon an adjoining conveyor line to be transported to subsequent processing stations for drying and labeling.

Due to the preliminary cooling applied primarily to the head spaces of the cans within valve B, it is unnecessary that a super-atmospheric pressure be established upon the cooling liquid in the tank 71 to protect the cans from injuries resulting from excessive internal pressures. It should be noted, however, that the point at which the valve pockets 34 move into registry with the aperture 65 and hence enter into communication with the outside atmosphere, is located above the level of the cooling liquid, so that there may be a brief interval, after the protective atmosphere of compressed air around the pre-cooled cans has been released, before the cans are fully submerged in the cooling water; also, as the cans drop from the valve pockets 34 onto the cooler reel 73, they are subjected to some agitation which may cause a somewhat faster evaporation of the liquid within the can than would occur from a truly quiet surface. Therefore, although such an increased rate of evaporation remains still far below ebullition, it may be advisable to provide a water conduit 81 within the tank 71 above the level of the cooling water, which directs a spray of cold water against the cans as they drop through the aperture 65 and are carried by the reel 73 toward and into the water bath, so that there is uninterrupted continuity of cooling from the moment the protective atmosphere of compressed air is removed from a can until the can is actually submerged in the cooling bath. Continuously operating water sprays 82 may also be provided along the upper segment of the cylindrical tank 70 above the water level 80 so that there is no interruption in the continuity of cooling the cans, when said cans negotiate the upper segments of their helical path through the cooler C.

The process of my invention, as described above, makes it unnecessary to employ pressure coolers in connection with continuous sterilizers, and therefore permits an enormous saving in the cost of equipment and operation; and while I have explained my process with the aid of specific examples, it will be understood that my invention is not limited to the specific data disclosed by way of example which may be departed from to adapt the invention to different conditions, without departing from the spirit and scope of my invention. Also, my invention is not limited to the particular type of pre-cooling valve shown and described; those skilled in the art will readily conceive many other types of apparatus adapted to treat heated cans in the manner required by the invention to make pressure cooling unnecessary.

Having thus described my invention what I claim as new and desire to protect by Letters Patent is as follows:

1. In the process of sterilizing food-containing cans, sealed under conditions occluding non-condensable gases therein, by conducting them in continuous procession through a confined sterilizing amosphere of a temperature producing internal can pressures capable of causing buckling of the cans under atmospheric pressure; the method of treating said cans to permit atmospheric cooling thereof without causing buckling in spite of the occlusion of non-condensable gases in their head spaces, which comprises determining the buckling pressure of the cans employed; maintaining the sterilizing atmosphere below a temperature capable of raising the vapor pressure of the liquid can contents to said buckling pressure; and applying a cooling medium to the head space of said cans, as they are transferred from said confined sterilizing atmosphere to an atmospheric cooling medium, while maintaining them substantially under the pressure prevailing in said sterilizing atmosphere for the limited time necessary to lower the total pressure of the gases in the head space by condensation of part of the vapor component of said gases, to about the level of the vapor pressure of the liquid can contents.

2. In the process of sterilizing food-containing cans, sealed under conditions occluding noncondensable gases therein, by conducting them in continuous procession through a confined sterilizing atmosphere of a temperature producing internal can pressures capable of causing buckling of the cans under atmospheric pressure; the method of treating said cans to permit atmospheric cooling thereof without causing buckling in spite of the occlusion of non-condensable gases in their head spaces; which comprises determining the buckling pressure of the cans employed; maintaining the sterilizing atmosphere below a temperature capable of raising the vapor pressure of the liquid can contents to said buckling pressure; applying a cooling medium to the head space of said cans as they are removed from said confined sterilizing atmosphere for a period of from ½ to 20 seconds, while maintaining them substantially under the pressure prevailing in said sterilizing atmosphere, to reduce the total pressure in the head space of said cans to about the level of the vapor pressure of the liquid can contents; and thereafter continuing cooling uninterruptedly under atmospheric conditions.

3. In the process of sterilizing food-containing cans, sealed under conditions occluding non-condensable gases therein, by conducting them in a continuous procession through a confined sterilizing atmosphere at a temperature producing internal can pressures capable of causing buckling of said cans under atmospheric pressure, the method of treating said cans to permit atmospheric cooling thereof without causing buckling in spite of the occlusion of non-condensable gases in their head spaces; which comprises determining the buckling pressure of the cans employed; maintaining said sterilizing atmosphere below a temperature raising the vapor pressure of the liquid can contents to said buckling pressure; effecting partial condensation of the vapor in the head space of the cans, as they are removed from said sterilizing atmosphere, by applying a cooling medium to said head spaces for a period of from ½ to 20 seconds while maintaining them under a pressure of the order of the pressure prevailing in said sterilizing atmosphere, to reduce the head space pressure of said cans to about the level of the vapor pressure of the liquid can contents; and thereafter uninterruptedly continuing cooling under atmospheric conditions until the can contents are properly cooled.

4. The method of sterilizing food-containing cans, sealed under conditions occluding non-condensable gases therein, in continuous procession in a confined sterilizing atmosphere and thereafter cooling them in a cooling medium under atmospheric pressure without causing said cans to buckle in spite of the occlusion of non-condensable gases in the head space thereof; which comprises determining the buckling pressure of the cans employed; maintaining said confined sterilizing atmosphere at a temperature below the temperature capable of raising the vapor pressure of the liquid can contents to said buckling pressure; applying at the end of said confined sterilizing atmosphere a cooling medium to the head space of said cans while maintaining them substantially under the pressure prevailing in said sterilizing atmosphere, for the limited time necessary to lower the total pressure of the gases in the head space to about the level of the vapor pressure of the liquid can contents, and subjecting the cans thus treated without interruption to said atmospheric cooling medium.

5. The method of sterilizing food-containing cans, sealed under conditions occluding non-condensable gases therein, in continuous procession in a confined sterilizing atmosphere and thereafter cooling them in a cooling medium under atmospheric pressure without causing said cans to buckle in spite of the occlusion of non-condensable gases in the head space thereof; which comprises determining the buckling pressure of the cans employed, maintaining said confined sterilizing atmosphere at a temperature below the temperature capable of raising the vapor pressure of the liquid can contents to said buckling pressure, applying at the end of said confined sterilizing atmosphere a cooling medium to the head space of said cans over a period of not more than 20 seconds, while maintaining them substantially under the pressure prevailing in said steam atmosphere, to cause partial condensation of the vapor component in the head space of said cans and lower the total head space pressure to about the level of the vapor pressure of the liquid can contents, and subjecting the cans thus treated without interruption to said atmospheric cooling medium.

6. The method of processing sealed food-containing cans which comprises conducting them in a procession through a confined sterilizing atmosphere, applying a cooling medium to the head space of said cans at the end of said atmosphere for a period of less than 20 seconds while maintaining them under an external pressure of about the order of the pressure prevailing in said sterilizing atmosphere, releasing said external pressure, submerging said cans into a cooling medium under atmospheric pressure directly upon release of said external pressure and maintaining said cans in said atmospheric cooling medium until they are thoroughly cooled.

7. In the process of sterilizing sealed food-containing cans by conducting them through a sterilizing atmosphere containing steam heated to a temperature producing internal can pressures capable of causing buckling of said cans under atmospheric pressures; the method of treating said cans to permit atmospheric cooling thereof without risking buckling in spite of the occlusion of non-condensable gases within the head spaces of said cans, which comprises determining the buckling pressure of the cans, maintaining said sterilizing atmosphere at a temperature below the temperature capable of raising the vapor pressure of the liquid can contents to said buckling pressure, establishing an atmosphere of a compressed non-condensable gas around each can as it is withdrawn from said sterilizing atmosphere, applying a cooling medium to each can while it is within said atmosphere of compressed non-condensable gas, releasing said atmosphere of compressed non-condensable gas around the can after a period of from ½ to 20 seconds, and continuing cooling of the cans uninterruptedly until the contents of the cans are thoroughly cooled.

References Cited in the file of this patent

UNITED STATES PATENTS

| Number | Name | Date |
|---|---|---|
| 1,408,430 | Anderson | Mar. 7, 1922 |
| 1,492,867 | Thompson | May 6, 1924 |
| 1,535,197 | Bach | Apr. 28, 1925 |
| 1,570,236 | Fooks | Jan. 19, 1926 |
| 1,976,754 | Thompson | Oct. 16, 1934 |